(12) United States Patent
Kirillov et al.

(10) Patent No.: US 11,408,983 B2
(45) Date of Patent: Aug. 9, 2022

(54) LIDAR 2D RECEIVER ARRAY ARCHITECTURE

(71) Applicant: Infineon Technologies AG, Neubiberg (DE)

(72) Inventors: Boris Kirillov, Graz (AT); Thomas Gigl, Graz (AT); Marcus Edward Hennecke, Graz (AT)

(73) Assignee: Infineon Technologies AG

( * ) Notice: Subject to any disclaimer, the term of this patent is extended or adjusted under 35 U.S.C. 154(b) by 959 days.

(21) Appl. No.: 16/148,550

(22) Filed: Oct. 1, 2018

(65) Prior Publication Data

US 2020/0103507 A1 Apr. 2, 2020

(51) Int. Cl.
*G01S 7/4863* (2020.01)
*G01S 7/481* (2006.01)

(52) U.S. Cl.
CPC .......... *G01S 7/4863* (2013.01); *G01S 7/4817* (2013.01)

(58) Field of Classification Search
None
See application file for complete search history.

(56) References Cited

U.S. PATENT DOCUMENTS

| | | |
|---|---|---|
| 2004/0179119 A1 | 9/2004 | Jelley |
| 2007/0215706 A1 | 9/2007 | Kotlarsky |
| 2009/0033779 A1* | 2/2009 | Mo .................. H04N 5/3658 348/308 |
| 2014/0231631 A1 | 8/2014 | Moore |
| 2015/0070544 A1* | 3/2015 | Smith ............... H01L 27/14627 348/297 |
| 2015/0172578 A1* | 6/2015 | Kirsch ................... H04N 5/379 348/302 |
| 2015/0263762 A1 | 9/2015 | Shen |

(Continued)

FOREIGN PATENT DOCUMENTS

WO 17193269 A1 11/2017

OTHER PUBLICATIONS

Niclass, Cristiano "Design and characterization of a 256×64-pixel single-photon imager in CMOS for a MEMSbased laser scanning time-of-flight sensor" in: Optics Express (Applied Optics Lab., Toyota Central R&D Labs, Inc., May 10, 2012), vol. 20, No. 11, pp. 11863-11881.

*Primary Examiner* — Yuqing Xiao
*Assistant Examiner* — Benjamin Richard Hebert
(74) *Attorney, Agent, or Firm* — Design IP

(57) ABSTRACT

A LIDAR system includes a receiver configured to receive a reflected light beam from a receiving direction, the reflected light beam having an oblong shape that extends in a lengthwise direction. The LIDAR receiver includes a two-dimensional (2D) photodetector array including a plurality of pixel rows and a plurality of pixel columns, wherein the reflected light beam, incident on the 2D photodetector array, extends in the lengthwise direction along at least one receiving pixel column of the plurality of pixel columns according to the receiving direction; an analog readout circuit including a plurality of output channels configured to read out electrical signals; and a multiplexer configured to, for each reading cycle, selectively couple receiving pixels of the at least one receiving column to the plurality of output channels based on the receiving direction, while decoupling non-receiving pixels from the plurality of output channels based on the receiving direction.

18 Claims, 10 Drawing Sheets

(56) References Cited

U.S. PATENT DOCUMENTS

| | | | |
|---|---|---|---|
| 2015/0285625 A1* | 10/2015 | Deane | G01S 7/4816 348/140 |
| 2017/0195604 A1* | 7/2017 | Shen | H04N 5/35581 |
| 2017/0242108 A1* | 8/2017 | Dussan | G01S 7/487 |
| 2017/0301716 A1 | 10/2017 | Irish | |
| 2018/0120433 A1 | 5/2018 | Eichenholz | |
| 2018/0209846 A1 | 7/2018 | Mandai | |
| 2018/0217240 A1 | 8/2018 | Qiu et al. | |
| 2018/0341009 A1* | 11/2018 | Niclass | G01S 7/4815 |
| 2019/0011567 A1* | 1/2019 | Pacala | G01S 7/4817 |

* cited by examiner

LIDAR 2D RECEIVER ARRAY ARCHITECTURE

FIELD

The present disclosure relates generally to devices and methods for Light Detection and Ranging (LIDAR).

BACKGROUND

Light Detection and Ranging (LIDAR), is a remote sensing method that uses light in the form of a pulsed laser to measure ranges (variable distances) to one or more objects in a field of view. In particular, light is transmitted towards the object. Arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

SUMMARY

Embodiments provide Light Detection and Ranging (LIDAR) systems and LIDAR readout methods.

According to one or more embodiments, a LIDAR system includes a LIDAR receiver configured to receive a reflected light beam from a receiving direction, the reflected light beam having an oblong shape that extends in a lengthwise direction. The LIDAR receiver includes a two-dimensional (2D) photodetector array including a plurality of pixel rows and a plurality of pixel columns, wherein each pixel of the 2D photodetector array is configured to generate electrical signals based on received light, wherein the reflected light beam, incident on the 2D photodetector array, extends in the lengthwise direction along (at least partially over) at least one receiving pixel column of the plurality of pixel columns according to the receiving direction; an analog readout circuit including a plurality of output channels configured to read out the electrical signals; and a multiplexer configured to, for each reading cycle, selectively couple receiving pixels of the at least one receiving column to the plurality of output channels based on the receiving direction, while decoupling non-receiving pixels not included in the at least one receiving pixel column from the plurality of output channels based on the receiving direction.

In addition, the multiplexer may be configured to selectively couple each of the plurality of output channels to at least one different pixel row of the plurality of pixel row for each reading cycle.

BRIEF DESCRIPTION OF THE DRAWINGS

Embodiments are described herein making reference to the appended drawings.

DETAILED DESCRIPTION

Figure 1:
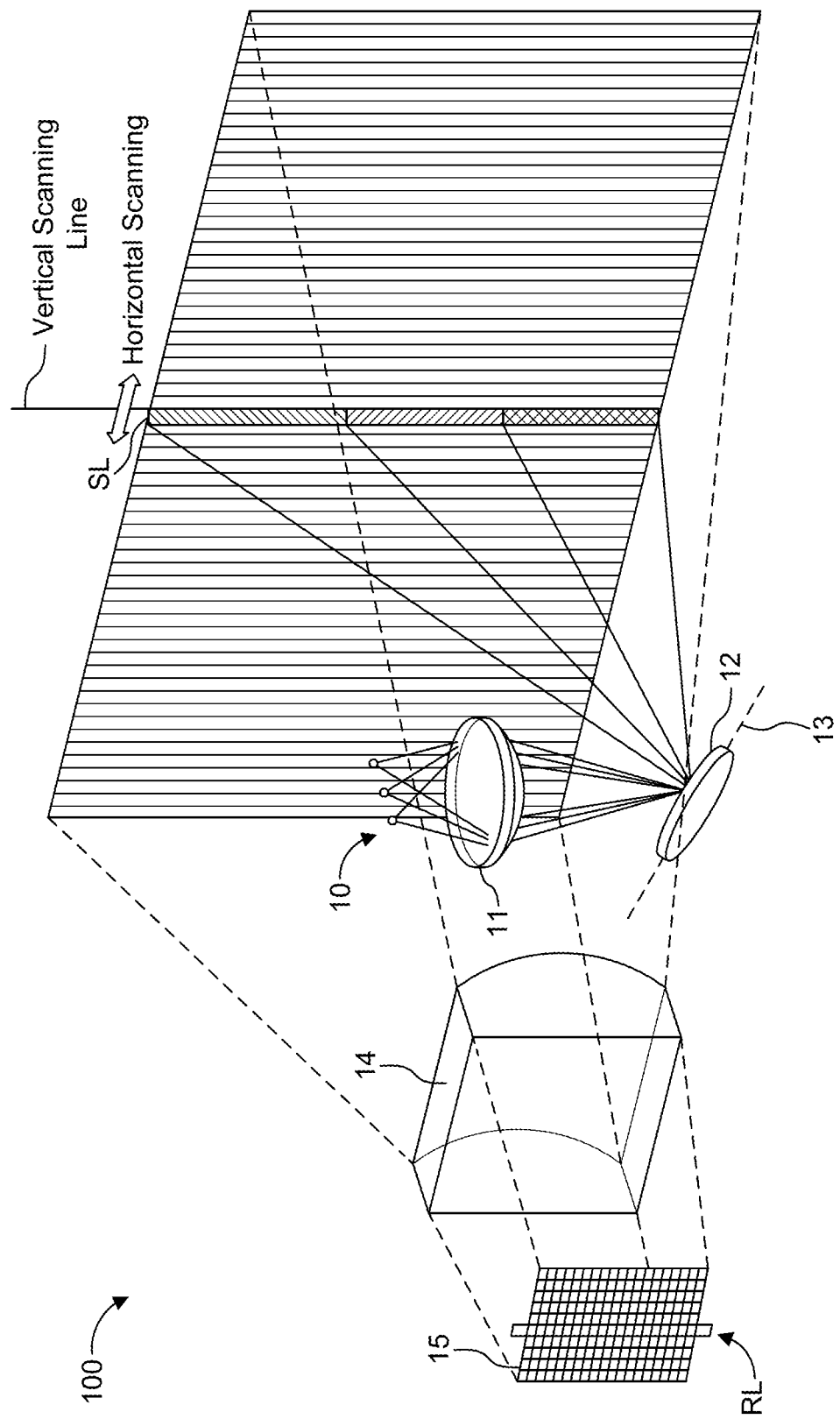
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photos of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In LIDAR systems, a source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receive reflections from objects illuminated by the light.

Currently, a two-dimensional (2D) photodetectors array may be used to measure the reflected light. However, a number of pixel rows in a 2D photodetector array can be quite large, which, in proportion, increases the size of a readout circuit of the array due to the number of output channels needed to output information for each pixel row. Therefore, an improved device having a reduced number of output channels despite a large 2D photodetector array may be desirable.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted until a time the reflected light pulse is received at the receiver (i.e., at the pixel array). The "time-of-flight" of the light pulse is then translated into a distance.

A scan such as a oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. A raster scan could also be used.

Figure 2:
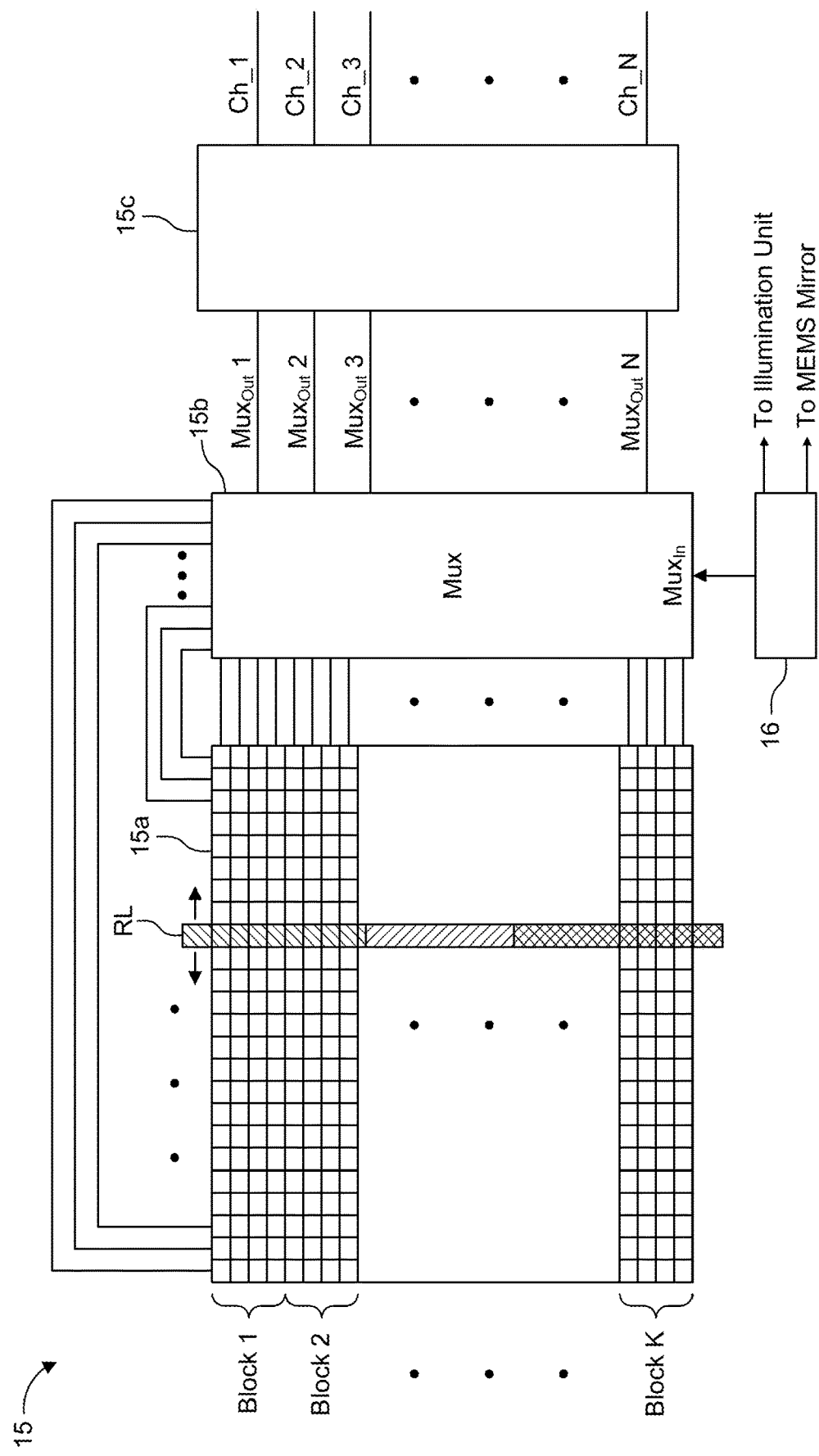
FIG. 2 shows a schematic diagram of the optical receiver according to one or more embodiments.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. FIG. 2 shows a schematic diagram of the optical receiver 15 according to one or more embodiments. The optical receiver 15 includes a 2D photodetector array 15a, a multiplexer 15b, and an analog readout circuit 15c.

The 2D photodetector array 15a is arranged in such a manner that an intended field of view is mapped on the 2D extension of the photodetector array 15a. Compared to the usage of a 1D detector array in a focal plane of an optical system, the usage of a 2D photodetector array as described above allows to significantly reduce background light in a measurement since the background light from the field of view is now distributed amongst multiple columns. A received light beam however will hit only a specific column or specific columns of the 2D detector array depending on the horizontal position of the vertical scan line.

The illumination unit 10 includes three light sources (e.g., laser diodes or light emitting diodes) that are linearly aligned in single bar formation and are configured to transmit light used for scanning an object. The light emitted by the light sources is typically infrared light although light with other wavelength might also be used. As can be seen in the embodiment of FIG. 1, the shape of the light emitted by the light sources is spread in a direction perpendicular to the transmission direction to form a light beam with an oblong shape perpendicular to a transmission. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form for each emitted laser shot a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple segments, where each segment corresponds to a respective light source. However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view. The vertical scanning line SL may in one embodiment include multiple vertical portions which are shifted slightly horizontally to each other due to a respective time-shiftings of the laser shot time of the respective light sources.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single axis and can be said to have only one degree of freedom for movement. Distinguished from 2D-MEMS mirrors (2D MEMS scanners), in the 1D MEMS mirror, the single axis is fixed to a non-rotating substrate and therefore maintains its spatial orientation during the oscillation of the MEMS mirror. Due to this single axis of rotation, the MEMS mirror 12 is referred to as a 1D MEMS mirror or 1D MEMS scanner.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees to steer the light over 30 degrees making up the scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis. LIDAR systems using 1D-scanning mirrors can use a more relaxed shot-rate of the illumination unit 10 (i.e., transmitter) 10 compared to 2D-scanning mirrors which use laser points for scanning the field of view which requires more shots for the transmitter to scan a field of view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected back towards the LIDAR scanning system 100 where the optics 14 (e.g., a lens) receives the reflected light. The optics 14 directs the reflected light onto the 2D photodetector array 15a.

The 2D photodetector array 15a can be any of a number of photodetector types; including avalanche photocliodes (APD), photocells, and/or other photocliode devices. Imaging sensors such as charge-coupled devices (CCDs) can be the photodetectors. In the examples provided herein, the optical receiver 15 is an APD array that comprises a multiple rows and multiple columns of APD pixels.

More specifically, the 2D photodetector array 15a may be mapped to K pixel blocks, with each block including M pixel columns and N pixel rows, where K, M, and N are integers greater than one. Thus, the 2D photodetector array 15a includes a multiple number (i.e., K) of N pixel rows (i.e., K×N pixel rows). Here, each photodetector in the photodetector array 15a may be referred to as a pixel, each row may be referred to as a pixel row, and each column may be referred to as a pixel column.

In addition, as will be described in more detail below, each row of the 2D photodetector array 15a may be selectively coupled and decoupled by the multiplexer 15b to the analog readout circuit 15c. A pixel, a row, or a column that is coupled to the analog readout circuit 15c may be referred to as active, while a pixel, a row, or a column that is not coupled to the analog readout circuit 15c may be referred to as inactive.

The analog readout circuit 15c includes N analog output channels (i.e., the same number of N rows in a K block of the 2D photodetector array 15a) configured to read out measurement signals received from a selected pixel of a coupled row of the 2D photodetector array 15a. Furthermore, more than one pixel from a coupled row may be selected, multiple rows may simultaneously be coupled to an output channel, and one or more pixels may be selected from each coupled row. The selection of the one or more pixels within each coupled row will be described in more detail below.

These measurement signals are then transmitted to the processing and control unit for data processing, including the time-of-flight computations as described above. For example, the processing and control unit may include an analog-to-digital converter (ADC) for each photocliode and a field programmable gate array (FPGA) that record the time-of-flight. The selective coupling of the pixel rows to an output channel of the readout circuit 15c allows using less readout channels than a number of rows of the photodetector array 15a by multiplexing the pixel rows to the readout channels. It is also noted that one or more pixel rows may be coupled to a particular output channel at a time.

When a pulse of laser energy as a vertical scanning line SL enters the field of view from the surface of MEMS mirror 12, reflective pulses appear when the laser light illuminates an object in the field of view. These reflective pulses arrive at the photodetector array 15a as a vertical column of light that may, for example, have the width of one photodetector pixel and a length that spans vertically at least partially along a pixel column of the photodetector array 15a in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, two or more pixel columns may receive light from a same bar of light. For example, two pixel columns may receive light when a portion of the received bar of light impinges on an area between two photodetector pixels. In this case, two pixel columns may be partially illuminated by a single bar of light in the width direction.

On the other hand, if a partial vertical scanning line SL is generated by the illumination unit 10, as described above, then only a partial pixel column of the photodetector array 15a may be illuminated in a lengthwise direction.

The photodetector array 15a is configured to generate measurement signals (electrical signals) used for generating a 3D map of the environment based on the reflected light (e.g., via TOF calculations and processing). For example, as noted above, the photodetector array 15a may be a 2D array of photodiodes or other light detection component capable of detecting and measuring light, and generating electrical signals therefrom.

The photodetector array 15a receives reflected light pulses. Since the time of transmission of each light pulse from the illumination unit 10 is known, and because the light travels at a known speed, a time-of-flight computation can determine the distance of objects from the optical receiver 15.

In one example, for each distance sampling, a microcontroller triggers a laser pulse from each of the light sources of the illumination unit 10 and also starts a timer in a Time-to-Digital Converter (TDC) Integrated Circuit (IC) in the processing and control unit. The laser pulse is propagated through the transmission optics, reflected by the target field, and captured by one or more receiving APDs of the photodetector array 15a. Each receiving APDs emits a short electrical pulse that is read out by the analog readout circuit 15c.

Each signal that is read out of the analog readout circuit 15c is then amplified by an electrical signal amplifier. A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. The microcontroller may trigger a next light pulse at the illumination unit 10 to scan a new field location. By emitting successive light pulses in different directions, an area can be scanned, a three-dimensional image can be generated, and objects within the area can be detected.

While not shown, the LIDAR scanning system 100 may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15a. For example, the DMD would first receive the reflected light pulse from the primary optics, and deflect the received reflected light through the secondary optics (e.g., a lens, a total internal reflection (TIR) prism, or a beam splitter) onto the photodetector array 15a. In this case, the photodetector array 15a would still receive a vertical column of light, as described above.

Various methods are provided for reading out measurement signals (electrical signals) from the photodetector array 15a during a reading cycle. A reading cycle corresponds to a scanning period of the LIDAR scanning system (e.g., a scanning period is a time period corresponding to the movement of the scan line from the left edge of the field of view to the right edge of the field of view and back to the left edge). A single reading cycle may represent a fraction or a multiple of a scanning period. For example, a half-scanning period (e.g., only from one edge to the other edge of the field of view) may also be used to define a period of a reading cycle for reading out measurement signals. In another application, two or more scanning periods may define a reading cycle. In this case, multiple shots taken over the course of the reading cycle may be averaged together to obtain a good signal-to-noise ratio (SNR). A reading cycle may be a predetermined period of time (i.e., a constant time period) configured by a controller, or may be defined by a number of light pulses transmitted by the transmitter.

As shown in FIG. 2, the 2D photodetector array 15a is a (K×N)×M array, where N is 4 and M is 24. Thus, there are K blocks, each with 4 pixel rows and 24 pixel columns.

A vertical column of light (i.e., receiving line RL) is shown that extends along one of the pixel columns in a lengthwise direction of the pixel column. The receiving line has three regions that correspond to the vertical scanning line SL shown in FIG. 1. As the vertical scanning line SL moves horizontally across the field of view, the vertical column of light RL incident on the 2D photodetector array 15a also moves horizontally across the 2D photodetector array 15a. The reflected light beam RL moves from a first edge of the 2D photodetector array 15a to a second edge of the 2D photodetector array 15a as the receiving direction of the reflected light beam RL changes. The receiving direction of the reflected light beam RL corresponds to a transmission direction of the scanning line SL.

In case the number of laser pulses (laser shots) during one scanning period (corresponding to the number of laser scan lines during one period) is greater than the number of columns M, respective columns may receive more than one laser pulse during one scanning period. In an example configuration, the number of laser pulses during one scanning period may be between 1 and 125 for a mirror oscillating at 2 kHz. Furthermore, the number of columns may be between 1 and 125, although the maximum is not necessarily limited thereto.

As shown, each output Muxout1-MuxoutN of the multiplexer 15b corresponds to an analog output channel of the N analog output channels Ch_1-Ch_N of the analog readout circuit 15c. However, it will be appreciated that, while shown as separate units, the multiplexer 15b and the analog readout circuit 15c may be integrated together as a single circuit. In this case, each output Muxout1-MuxoutN of the multiplexer 15b would be the same as an analog output channel Ch_1-Ch_N.

In some embodiments, the ratio of the number N of output channels to the number of rows K×N of the 2D photodetector array 15a may be at least 1:2. In some embodiments, the ratio of the number N of output channels to the number of rows K×N of the 2D photodetector array may be at least 1:4. In some embodiments, the ratio of the number N of output channels to the number of rows K×N of the 2D photodetector array may be at least 1:8.

Each pixel row of the 2D photodetector array 15a is coupled to the multiplexer 15b to transmit measurement signals from the activated pixels of each row thereto. Furthermore, each pixel row may be selectively coupled and decoupled by the multiplexer 15b to the analog readout circuit 15c. The multiplexer 15b may be configured according to one of the various methods described herein, and may be reconfigured according a second one of the various methods described herein to change a method of reading out the measurement signals. Thus, the multiplexer 15b may be completely reconfigurable to employ different read out techniques and may receive a configuration signal at an input terminal Mux for receiving configuration information indicating the readout technique to be used. Each readout technique may be directed to pixel row multiplexing such that each output channel is selectively coupled to one or more pixel rows for a predetermined period of time before being selectively coupled to a different one or more pixels rows for a predetermined period of time. Thus, different subsets of pixel rows may be coupled to the readout channels during different readout cycles. For example in a first readout cycle, a first subset of pixel rows may be coupled to the readout channels while in a second readout cycle a second subset of pixel rows may be coupled to the readout channels.

In addition, each of the pixel columns of the 2D photodetector array 15a may be selectively coupled and decoupled to the multiplexer 15b. Thus, while each pixel row may be coupled to the multiplexer 15b, not necessarily every pixel from that pixel row may be connected to the multiplexer 15b for providing an output thereto. That is, only the pixels in the selected pixel columns of a pixel row provide a measurement signal to the multiplexer 15b. It will be appreciated that while a single multiplexer circuit 15b is shown, two multiplexer circuits, one for selecting the pixel rows and one for selecting the pixel columns, may be used.

According to an example, a single pixel row is coupled to an output channel. For each laser pulse, a pixel or a pair of neighbor pixels (for example, if the scan line RL impinges two columns) is selected within the coupled pixel row to provide the measurement signals for the coupled output channel. The selection is based on the position of the scan line SL or the receiving line RL (both of which correspond to the position of the scanning mirror) and therefore the selected pixel or the selected group of pixels varies over a scanning period. To this end, the scanning mirror 12 provides position information (e.g., mirror angle information) to a control unit (e.g., controller 16). The control unit determines based on the position information which column number of the photodetector array 15a is expecting the reflected vertical line, receiving line RL. Based on the column number expecting the receiving line RL, the corresponding pixels of the rows coupled to the output channel are selected by the multiplexer 15b for providing measurement signals.

Each pixel is connected to a corresponding channel during a time at which reflected light is expected to be incident thereon. This expected time may be a receiving period of a predefined duration. This receiving period can be calculated based a transmission time of a light pulse from the illumination unit 10. Based on this implementation, the pixels to be read out can be synchronized with the transmission angle (i.e., transmission direction) of the MEMS mirror 12 by appropriately controlling the multiplexer 15b to appropriately select pixels by pixel row and pixel column via array coordinates. This control information may be received at the Mux$_{in}$ terminal of the multiplexer 15b from a controller 16. The controller 16 may be a microcontroller, as described above, and may be coupled to each of the illumination unit 10, the MEMS mirror 12, and the optical receiver 15 for controlling each component via respective control signals.

After the receiving period has lapsed, pixels are disconnected from their respective channels, and one or more further pixels are connected to a respective channel. Similar to before, these further pixels are connected for a receiving period during which reflected light RL is expected to be incident thereon. After the receiving period has lapsed, the further pixels are disconnected from their respective channels, and other further pixels are connected to respective channels, and so on.

A scanning method may be used such that the pixel columns are scanned one at a time. Thus, the pixels of one pixel row are multiplexed to a single output channel during a reading cycle.

In another example, pixels from multiple adjacent columns can be connected to a respective output channel at a time. That is, in a single pixel row, two adjacent pixels from two adjacent columns may be connected to a channel during a receiving period. Following the expiration of the receiving period, the two pixels may be disconnected, and two further adjacent pixels in the row may be connected to the channel, where at least one pixel of the two further adjacent pixels is different from the previous two adjacent pixels (i.e., there may be overlap or no overlap). This process continues until an entire row is scanned.

In addition, the multiple connected columns are not limited to two columns. In fact, it is possible to connect all pixels of a pixel row (i.e., all columns) to a respective output.

As can be seen from the above example, two selection schemes are used for determining the pixels to be read-out at a respective point in time during scanning. The first selection scheme determines the column number of the pixel and is based on the position of the scan line SL or RL corresponding to the position of the mirror. The second selection scheme determines which rows are to be coupled to the number of output channels and determines the row number of the selected pixels. This row selection occurs typically on a slower time scale since the rows are typically coupled for at least one read-out cycle. Distinguished therefrom, as explained above, the column selection changes during the scanning period and the selection is therefore provided on a faster time scale compared to the row selection.

By using the above selection schemes, the LIDAR system can operate with a high SNR ratio while the number of output channels and the corresponding circuitry necessary for implementation is reduced. The mapping of the field of view to multiple columns and the utilization of the above column selection scheme allows the influence of background light to be reduced since the background light from the overall field of view is distributed over multiple columns and only one column or a pair of neighbor columns are activated at a time. With this only a portion of the overall background light is present at each measurement. On the other hand, the row selection allows reducing the number of output channels for the measurement. Therefore, an efficient implementation of the LIDAR system can be achieved. On the other hand, different row selection schemes can be provided as will be described below which increases the flexibility of the system.

The analog readout circuit 15c includes N channels Ch_1-Ch_N (i.e., the same number of N rows in each block of the 2D photodetector array 15a) configured to read out measurement signals received from a coupled row of the 2D photodetector array 15a. As will be demonstrated, the multiplexer 15b is configured to connect and disconnect one or more rows of the photodetector array 15a to an assigned channel (Ch_1-Ch_N) per reading cycle. This may be done for each channel per reading cycle. Thus, this connecting and disconnecting of rows may be done dynamically over multiple reading cycles.

The multiplexer 15b may also include analog combining logic that generates a combined measurement signal to be output to one of the channels of the analog readout circuit 15c. For example, the multiplexer 15b may receive measurement signals from two or more pixels of a pixel row, and combine the measurement signals together into a combined measurement signal before outputting the combined measurement signal to an assigned channel. The combined measurement signal may be a representation of discrete measurement signals being added or summed together. Additionally or alternatively, the multiplexer 15b may receive measurement signals from two or more pixels of a pixel column, and combine the measurement signals together into a combined measurement signal before outputting the combined measurement signal to an assigned channel. The combined measurement signal may be a representation of discrete measurement signals being added or summed together. Additionally or alternatively, the multiplexer 15b may receive measurement signals from two or more pixels of a pixel column and two or more pixels from a pixel row, and combine the measurement signals together into a combined measurement signal before outputting the combined measurement signal to an assigned channel. The combined measurement signal may be a representation of discrete measurement signals being added or summed together.

Figure 3:
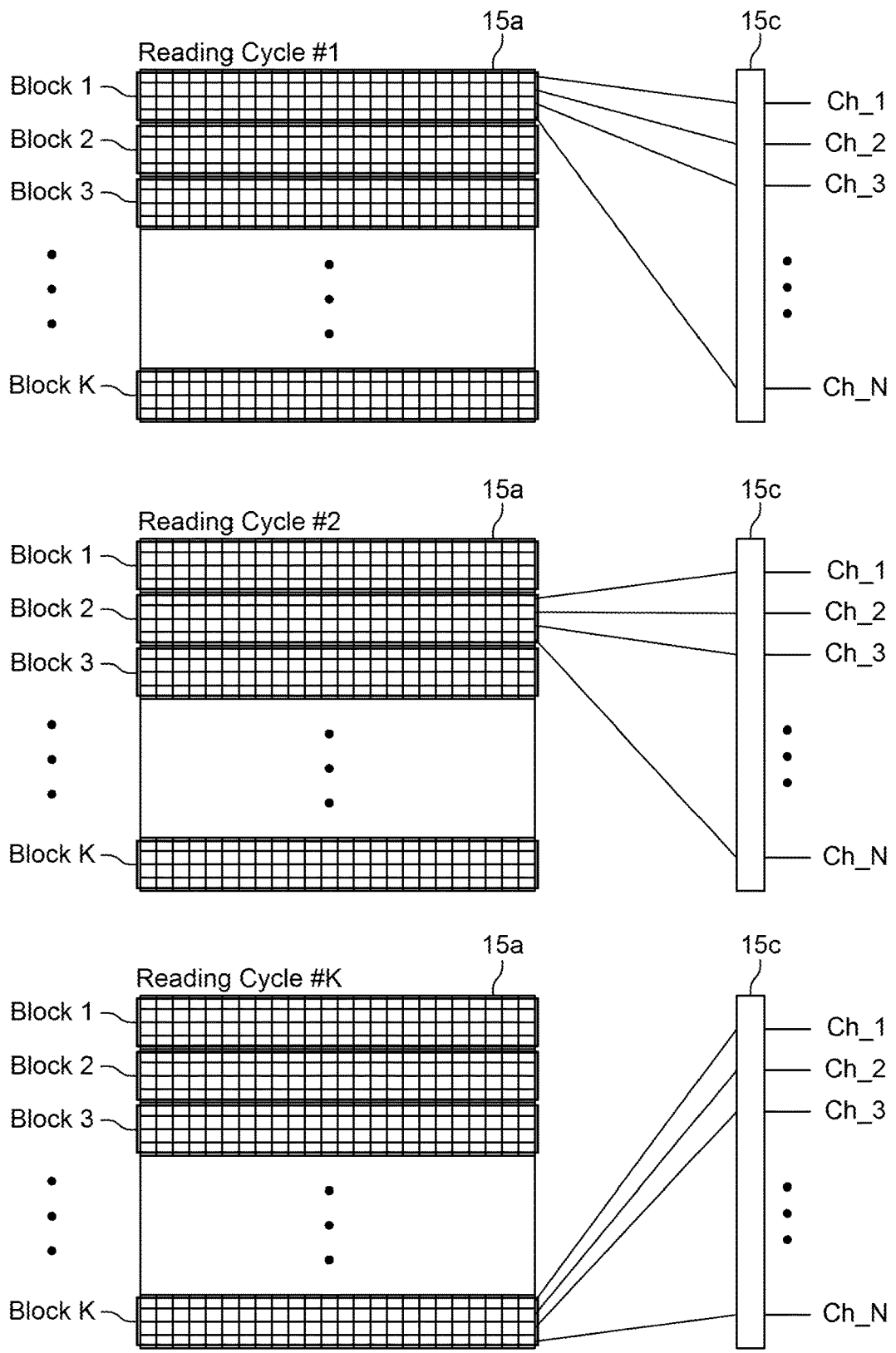
FIG. 3 shows a schematic diagram of an optical receiver demonstrating a readout method according to one or more embodiments.

FIG. 3 shows a schematic diagram demonstrating a readout method according to one or more embodiments. In particular, FIG. 3 shows a sequence of K reading cycles during which different pixel rows are sequentially coupled and/or decoupled to a channel of the analog readout circuit 15c. It is to be understood that in the following a read out of measurement signals from a row coupled to a channel includes the selection of specific pixels of this row according to the position of the scanning line SL or RL and a controlling to activate the feeding of the measurement signals from the selected row pixels to the respective output channel.

In the example of FIG. 3, each pixel row is assigned to a corresponding channel. This assignment may be configured through hardware in the multiplexer 15b (i.e., via the switching matrix), which is not shown for simplification of the illustration (see FIG. 2). For example, the first row of each pixel block (block 1-K) may be assigned to the first channel CH_1 of the readout circuit 15c. Thus, there are K first rows selectively coupled to channel CH_1 by the multiplexer 15b. The "assignment" is made through scanning line connections configured in the multiplexer 15b.

Similarly, the second row of each pixel block (block 1-K) may be assigned to the second channel CH_2 of the readout circuit 15c. Thus, there are K second rows selectively coupled to channel CH_2 by the multiplexer 15b. This arrangement continues through the Nth channel, where the Nth row of each pixel block (block 1-K) is assigned to the Nth channel CH_N of the readout circuit 15c.

During a first reading cycle, the pixel rows of the first pixel block (block 1) are coupled to their respective assigned channels Ch_1-Ch_N. As a result, measurement signals from each pixel row of the first pixel block are read out from the readout circuit 15c.

During a second reading cycle, the pixel rows of the second pixel block (block 2) are coupled to their respective assigned channels Ch_1-Ch_N. As a result, measurement signals from each pixel row of the second pixel block are read out from the readout circuit 15c.

This process continues sequentially through the Kth reading cycle, during which the pixel rows of the Kth pixel block (block K) are coupled to their respective assigned channels Ch_1-Ch_N. As a result, measurement signals from each pixel row of the Kth pixel block are read out from the readout circuit 15c.

Thus, in each reading cycle, all rows in a selected block are connected to a respective output channel.

During a reading cycle, N channels may be connected to N pixels on a one-to-one basis. Each pixel is connected to a corresponding channel during time at which reflected light is expected to be incident thereon. This expected time may be a receiving period of a predefined duration. This receiving period can be calculated based a transmission time of a light pulse from the illumination unit 10, and the pixel to be connected to the channel may be selected based on a transmission angle of the MEMS mirror 12 at the transmission time. Thus, the pixel to be read out can be synchronized with the transmission angle (i.e., transmission direction) of the MEMS mirror 12 by appropriately controlling the multiplexer 15b, as described above in reference to FIG. 2. The transmission angle depends on the rotation angle of the MEMS mirror 12 at the time the laser pulse is emitted by the light sources. Thus, the pixel read out is synchronized to the rotation angle of the MEMS mirror 12. A sensing circuit may be coupled to the MEMS mirror 12 to determine information indicating the rotation angle at the time the light sources are activated to illuminate the vertical scan line. The information indicating the rotation angle of the MEMS mirror may be processed to determine a pixel column to be selected for activation. Information indicating the selected pixel column is supplied to the multiplexer of the photodetector array to activate the selected pixel column.

After the receiving period has lapsed, a pixel is disconnected from an output channel, and a further pixel of the same row is connected to the output channel. Similar to before, this further pixel is connected for a receiving period during which reflected light is expected to be incident thereon. After the receiving period has lapsed, the further pixel is disconnected from the output channel, and another further pixel is connected to the output channel, and so on. Here, a scanning method is used such that the pixel columns are scanned one at a time. Thus, the pixels of one pixel row are multiplexed to a single output channel during a reading cycle.

In another example, pixels from multiple adjacent columns can be connected to a respective output at a time. That is, in a single pixel row, two adjacent pixels from two adjacent columns may be connected to a channel during a receiving period. Following the expiration of the receiving period, the two pixels may be disconnected, and two further adjacent pixels in the row may be connected to the channel, where at least one pixel of the two further adjacent pixels is different from the previous two adjacent pixels (i.e., there may be overlap or no overlap). This process continues until an entire row is scanned.

In addition, the multiple connected columns are not limited to two columns. In fact, it is possible to connect all pixels of a pixel row (i.e., all columns) to a respective output.

As noted above, the multiplexer 15b may also include analog combining logic that generates a combined measurement signal to be output to each of the channels of the analog readout circuit 15c for averaging purposes. In the case of two or more pixels being connected to a corresponding channel, the analog combining logic first receives a measurement signal from each pixel, and generates the combined measurement signal before outputting the combined measurement signal to the corresponding channel. A combined measurement signal may thus be generated for each of the N channels for each read out.

Activating pixels one-by-one for providing read-out signals may be beneficial in heavy ambient light conditions in order to help reduce the ambient light affecting the measurements. Alternatively, reading out multiple pixels at a time may increase a readout speed and may be used, perhaps, when ambient light is less of a concern.

The optical receiver 15 may also be configured to switch between pixel blocks during a reading cycle. For example, the multiplexer 15b may be configured to connect block 1 to the channels CH_1-CH_N during a first portion of a first reading cycle, to connect block 2 to the channels CH_1-CH_N during a second portion of the first reading cycle, and to connect block K to the channels CH_1-CH_N during a Kth portion of the first reading cycle. Here, only a portion of the columns for each row for each block are read out during the first reading cycle.

Next, for a second reading cycle, different column portions of each block are read out. For example, the multiplexer 15b may be configured to connect block 1 to the channels CH_1-CH_N during a first portion of a second reading cycle, to connect block 2 to the channels CH_1-CH_N during a second portion of the second reading cycle, and to connect block K to the channels CH_1-CH_N during a Kth portion of the second reading cycle. However, each portion of each block being read out is different from the portion of each block read out during the first reading cycle. This process continues for K reading cycles until each pixel in each row has been read out by the readout circuit 15c.

In addition, the coupling of rows of a particular block may be synchronized with a particular light source or subset of light sources of the illumination unit 10. For example, as described above, each light source projects a corresponding vertical region into the field of view, and each vertical region makes up part of the scanning line SL. Consequently, each vertical region makes up part of the receiving line RL that is incident on the 2D photodetector array 15a, and each region of the receiving line RL overlaps with a finite number of blocks of the receiving line RL, as shown in FIG. 2. Thus, as the multiplexer 15b connects different blocks to the readout circuit 15c, the illumination of a corresponding light source can be synchronized with an associated block, while the other light sources may be turned off. This synchronization control may be received at the $Mux_{in}$ terminal of the multiplexer 15b from the controller 16 that also controls the firing of the light beams (e.g., lasers) from the light sources.

A row selection may change, as described above, based on completion of a reading cycle or a portion of a reading cycle. The row selection may also be changed by the multiplexer 15b after each received receiving line RL or after a certain number of received receiving lines RLs. This row selection change may also be based on the transmission of the scanning line SL (e.g., after each transmission or after a certain number of transmission). This row selection change may also occur based on which light sources fire a respective portion of the scanning line SL (e.g., all light sources or a subset thereof may be used to generate the scanning line SL).

Figure 4:
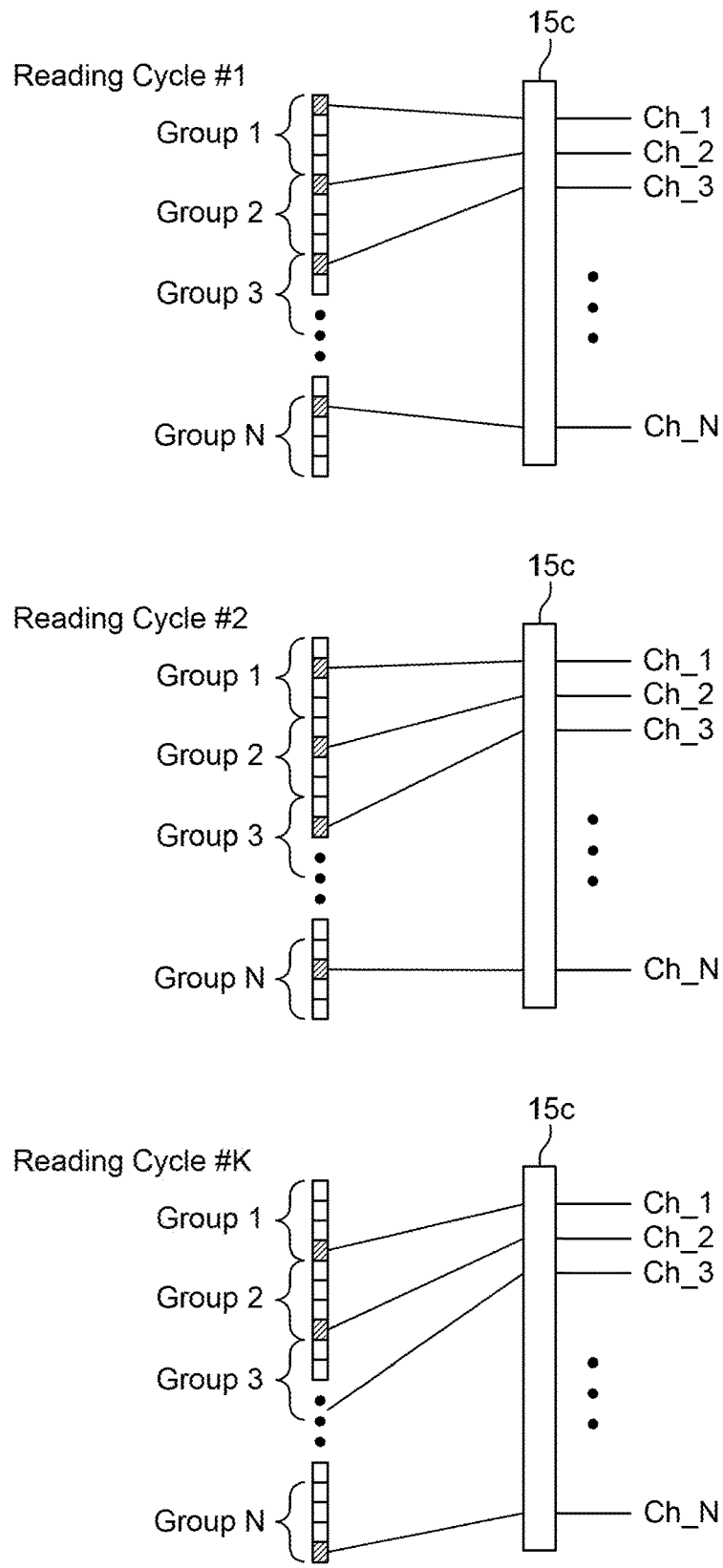
FIG. 4 shows a schematic diagram of an optical receiver demonstrating a readout method according to one or more embodiments.

FIG. 4 shows a schematic diagram of an optical receiver demonstrating a readout method according to one or more embodiments. In particular, FIG. 4 shows a sequence of K reading cycles during which different pixel rows are sequentially coupled and/or decoupled to a channel of the analog readout circuit 15c using an interleaving technique. Pixels in the pixel columns are arranged into N groups, each including K pixels. An example pixel column is shown in FIG. 4. The pixel column includes N groups or clusters, each having 4 pixels (K=4). Thus, the number of reading cycles can be configured based on the number of pixels in each group or cluster.

In this example, each pixel row is assigned to a corresponding channel. This assignment may be configured through hardware in the multiplexer 15b (i.e., via the switching matrix), which is not shown for simplification of the illustration (see FIG. 2). To implement read out interleaving, all light sources are fired resulting in a complete receiving line RL, and every Kth row of the entire pixel array is connected via multiplexer 15b to the readout circuit 15c for each reading cycle. Thus, one row from each group will be connected to the readout circuit 15c per reading cycle. Here, all pixel rows in the array can be read out in K reading cycles.

For example, during a first reading cycle, the first row of a first pixel group or cluster is connected to channel CH_1, the first row of the second pixel group or cluster is connected to channel CH_2, and the first row of the Nth pixel group or cluster is connected to channel CH_N. Furthermore, one or more columns is selected for those rows, which may be synchronized with the receiving line RL (or scanning line SL), as similarly described in reference to FIGS. 2 and 3. Here, as shown in FIG. 4, a single pixel from each block in the same column is selected for the reading cycles.

During a second reading cycle, the pixels for read out are shifted. Here, the second row of the first group or cluster is connected to channel CH_1, the second row of the second pixel group or cluster is connected to channel CH_2, and the second row of the Nth pixel group or cluster is connected to channel CH_N.

This process continues through the Kth reading cycle, during which the Kth row of the first pixel group or cluster is connected to channel CH_1, the Kth row of the second group or cluster is connected to channel CH_2, and the Kth row of the Nth pixel group or cluster is connected to channel CH_N.

A row selection may change, as described above, based on completion of a reading cycle or a portion of a reading cycle. The row selection may also be changed by the multiplexer 15b after each received receiving line RL or after a certain number of received receiving lines RLs. This row selection change may also be based on the transmission of the scanning line SL (e.g., after each transmission or after a certain number of transmission). This row selection change may also occur based on which light sources fire a respective portion of the scanning line SL (e.g., all light sources or a portion thereof may be used to generate the scanning line SL).

By using interleaving, a coarse 3D picture can be established after fewer readout cycle and prior to the full pixel.

Figure 5:
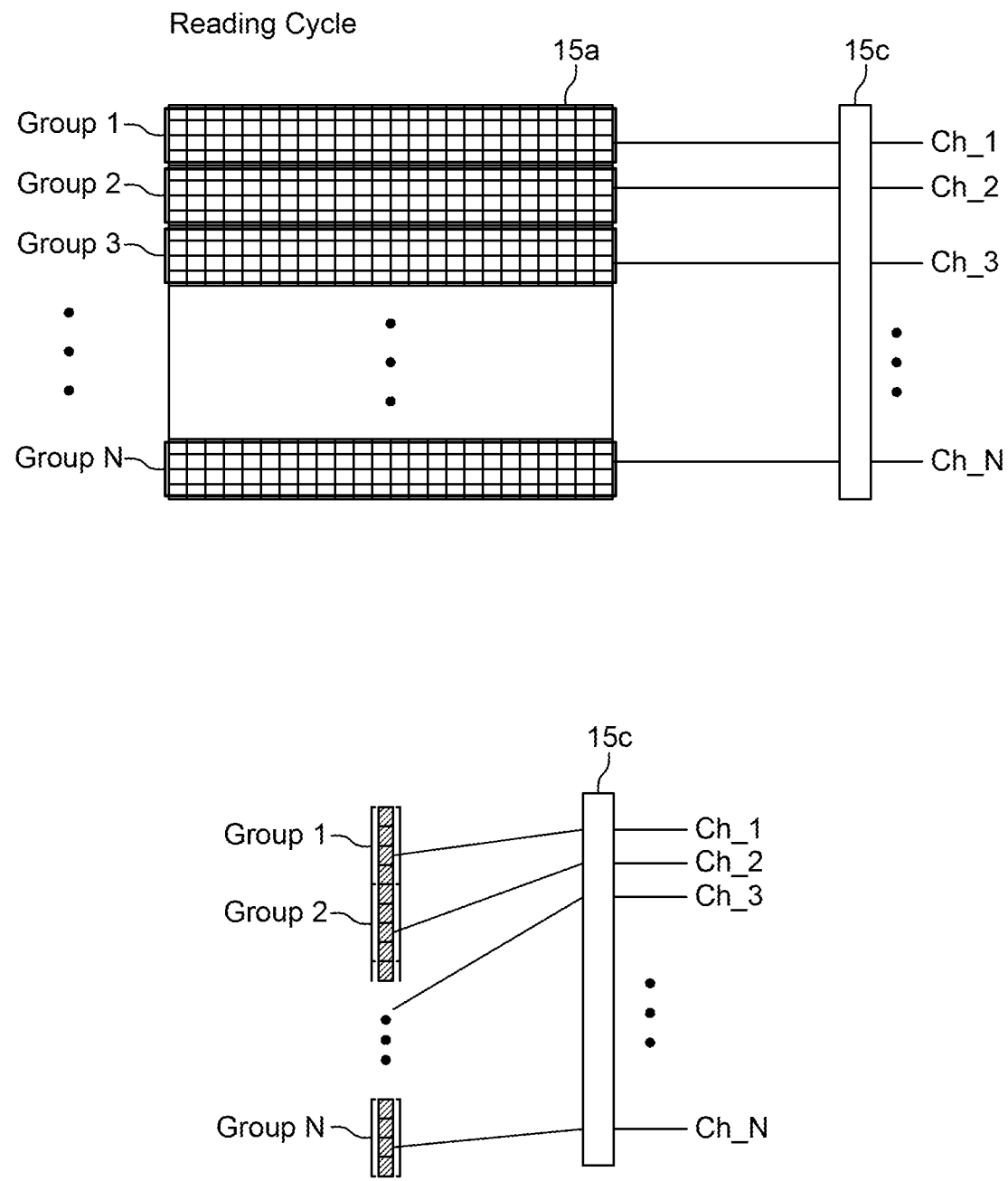
FIG. 5 shows a schematic diagram of an optical receiver demonstrating a readout method according to one or more embodiments.

FIG. 5 shows a schematic diagram of an optical receiver demonstrating a readout method according to one or more embodiments. In particular, FIG. 5 shows a single reading cycle during which different pixel rows are binned together for being coupled and/or decoupled to a channel of the analog readout circuit 15c.

Pixels in the pixel columns are arranged into N groups, each including K pixels, as shown in the upper part of FIG. 5. An example pixel column is shown in the lower part of FIG. 5. The pixel column includes N groups or clusters, each having 4 pixels (K=4). Vertical binning of the pixels in each group is used to read out all pixels rows in 1 reading cycle.

In this vertical binning technique, multiple pixel rows are assigned to a corresponding channel and at least two of those rows are output to the assigned channel. In the arrangement shown in FIG. 5, all rows of a group are simultaneously output to the same assigned channel. This channel assignment may be configured through hardware in the multiplexer 15b (i.e., via the switching matrix), which is not shown for simplification of the illustration (see FIG. 2). For example, each group, consisting of K rows, is connected to a respective one of the output channels CH_1-CN N. Thus, all rows from one group are connected to the same output channel.

As shown, the rows of group 1 are connected to channel CH_1, the rows of group 2 are connected to channel CH_2, and the rows of group N are connected to channel CH_N.

Furthermore, one or more columns is selected for reading out, which may be synchronized with the receiving line RL, as similarly described in reference to FIG. 3. Here, as shown in FIG. 5, a single pixel from each row in the same column (i.e., all pixels from a pixel column) is selected for the reading cycle. Once the reading cycle is complete, the column or group of columns may shift to another column or group of columns of the array for a further reading cycle. This may continue until all columns (i.e., all pixels) of the array have been read out.

As noted above, the multiplexer 15b may receive measurement signals from two or more pixels of a pixel column, and combine the measurement signals together before outputting the combined measurement signal to an assigned channel. Additionally or alternatively, the multiplexer 15b may receive measurement signals from two or more pixels of a pixel column and two or more pixels from a pixel row, and combine the measurement signals together before outputting the combined measurement signal to an assigned channel. This combining also applies to the vertical binning technique shown in FIG. 5.

By combining pixel values vertically, the sensitivity for large objects may be improved since the signal to noise ratio is increased. This allows for earlier detection of large objects from a further distance from the LIDAR system.

Figure 6:
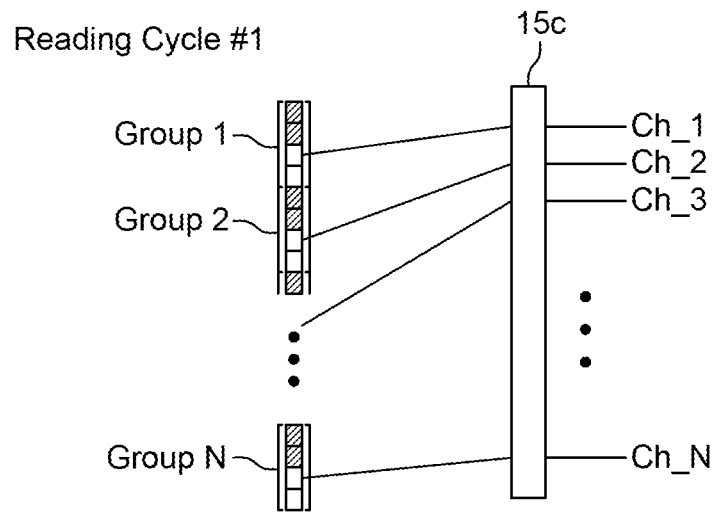
FIG. 6 shows a schematic diagram of an optical receiver demonstrating a readout method according to one or more embodiments.
Figure 6:
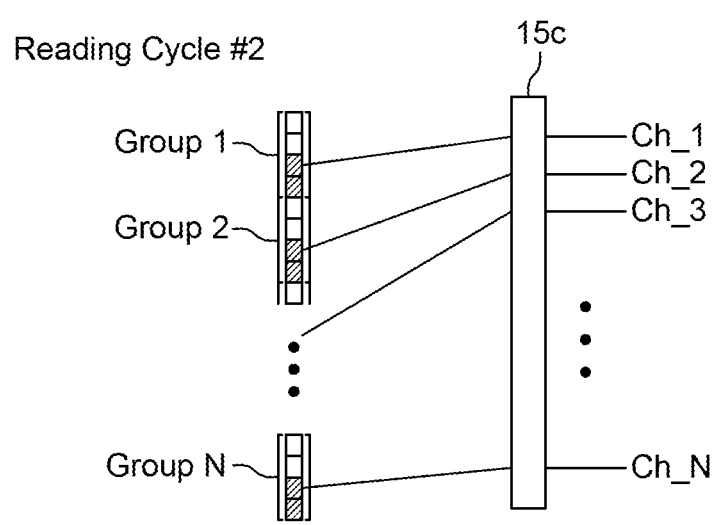

FIG. 6 shows a schematic diagram of an optical receiver demonstrating a readout method according to one or more embodiments. In particular, FIG. 6 shows a combination of the interleaving technique described in FIG. 4 and the vertical binning technique described in FIG. 5.

Much like in the upper part of FIG. 5, for this technique, pixels in the pixel columns are arranged into N groups, each including K pixels. An example pixel column is shown in FIG. 6. The pixel column includes N groups or clusters, each having 4 pixels (K=4). Each pixel group further includes two or more subsets R. Vertical binning of the pixels within each group is interleaved according to the subsets over R reading cycles. Thus, all pixels rows are read out in R reading cycles.

Here, multiple reading cycles (e.g., two) are used where pixels of a first subset of a vertically binned group are read out during a first reading cycle while pixels of a second or remaining subset of the vertically binned group are not read out, and pixels of the second subset are read out during a second reading cycle while pixels of the first or remaining subset of the vertically binned group are not read out. The number of reading cycles is equal to the number or subset a vertically binned group is broken into. Furthermore, the number of portions in a vertically binned group and the number of pixels in each subset is completely configurable.

In this case, the readout speed is faster than the interleaving technique used in FIG. 4 due to binning, and provides better resolution than the binning technique used in FIG. 5 due to interleaving.

Figure 7:
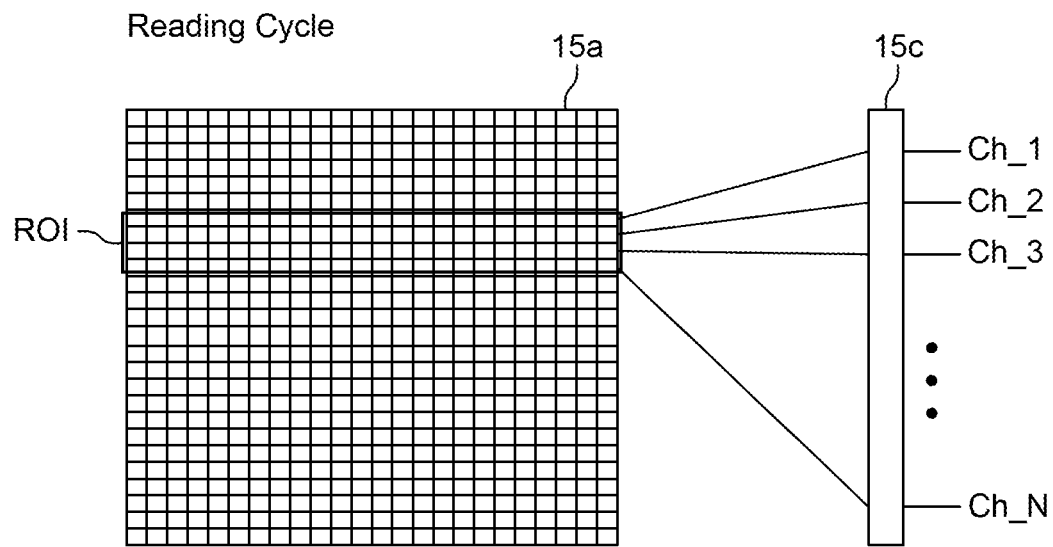
FIG. 7 shows a schematic diagram of an optical receiver demonstrating a readout method according to one or more embodiments.

FIG. 7 shows a schematic diagram demonstrating a readout method according to one or more embodiments. In particular, FIG. 7 shows a reading cycle during which a region of interest (ROI) is selected for read out. In particular, N rows of the pixel array are selected, each being respectively coupled to an assigned output channel CH_1-CH_N, and read out via the respective channel. Here, the N rows selected for read out are N consecutive (adjacent) rows that define the ROI. Thus, the ROI is formed by a contiguous set of N arbitrary pixels rows. One or more pixels (i.e., columns) may be selected for each row per reading cycle in accordance with the techniques described above.

In this example, each pixel row is not fixedly assigned to a particular output channel, as in FIG. 3, but may be dynamically connected to different output channels as the ROI changes. In some embodiments, each row may be connected to any output channel. This dynamic assignment may be configured through hardware in the multiplexer 15b (i.e., via the switching matrix), which is not shown for simplification of the illustration (see FIG. 2). However, the switching matrix of the multiplexer 15b in this instance is more complex that the switching matrix implemented in the example shown in FIG. 3 to allow for such dynamic assignments for each pixel row.

In addition, the ROI and the light sources of the illumination unit 10 may be synchronized by the controller 16 such that only the light sources responsible for the portion of the receiving line RL that is incident on the ROI are fired during that reading cycle. The ROI may change per reading cycle.

Figure 8:
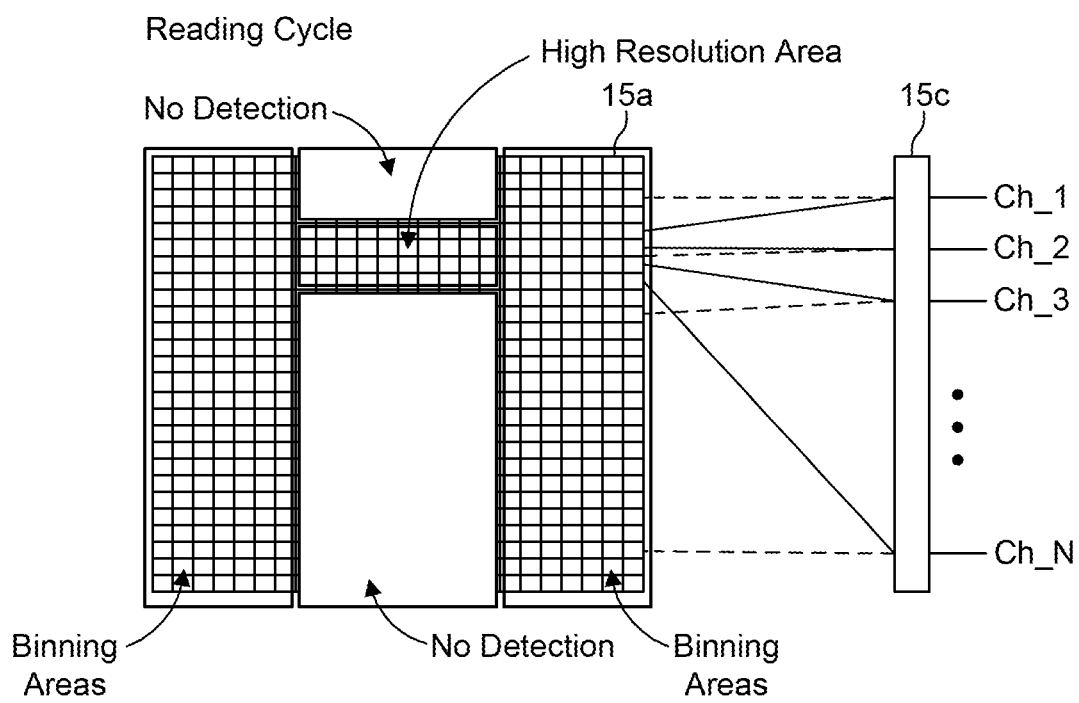
FIG. 8 shows a schematic diagram of an optical receiver demonstrating a readout method according to one or more embodiments.

FIG. 8 shows a schematic diagram demonstrating a readout method according to one or more embodiments. In particular, FIG. 8 shows a combination of the vertical binning technique described in FIG. 5 and the ROI technique described in FIG. 7. In particular, FIG. 8 shows a reading cycle during which a region of interest (ROI) defines a high resolution area, and binning areas define low resolution areas.

When performing a read out of the pixels in the ROI, N rows or less are connected to the equivalent N channels or less by the multiplexer 15b. Pixels in the ROI are not binned together. In addition, pixels that are outside the ROI but located in the same column as pixels of the ROI may be ignored as no detection areas.

When performing a read out of the pixels in the binning areas, multiple vertical binning groups are defined, much like in FIG. 5, such that multiple pixel rows are assigned to a corresponding channel. Thus, N vertical binning groups may be connected to N channels, with each binning group connected to a respective output channel by the multiplexer 15b.

Reading out the low resolution areas and the high resolution areas is accomplished in a single reading cycle.

Figure 9:
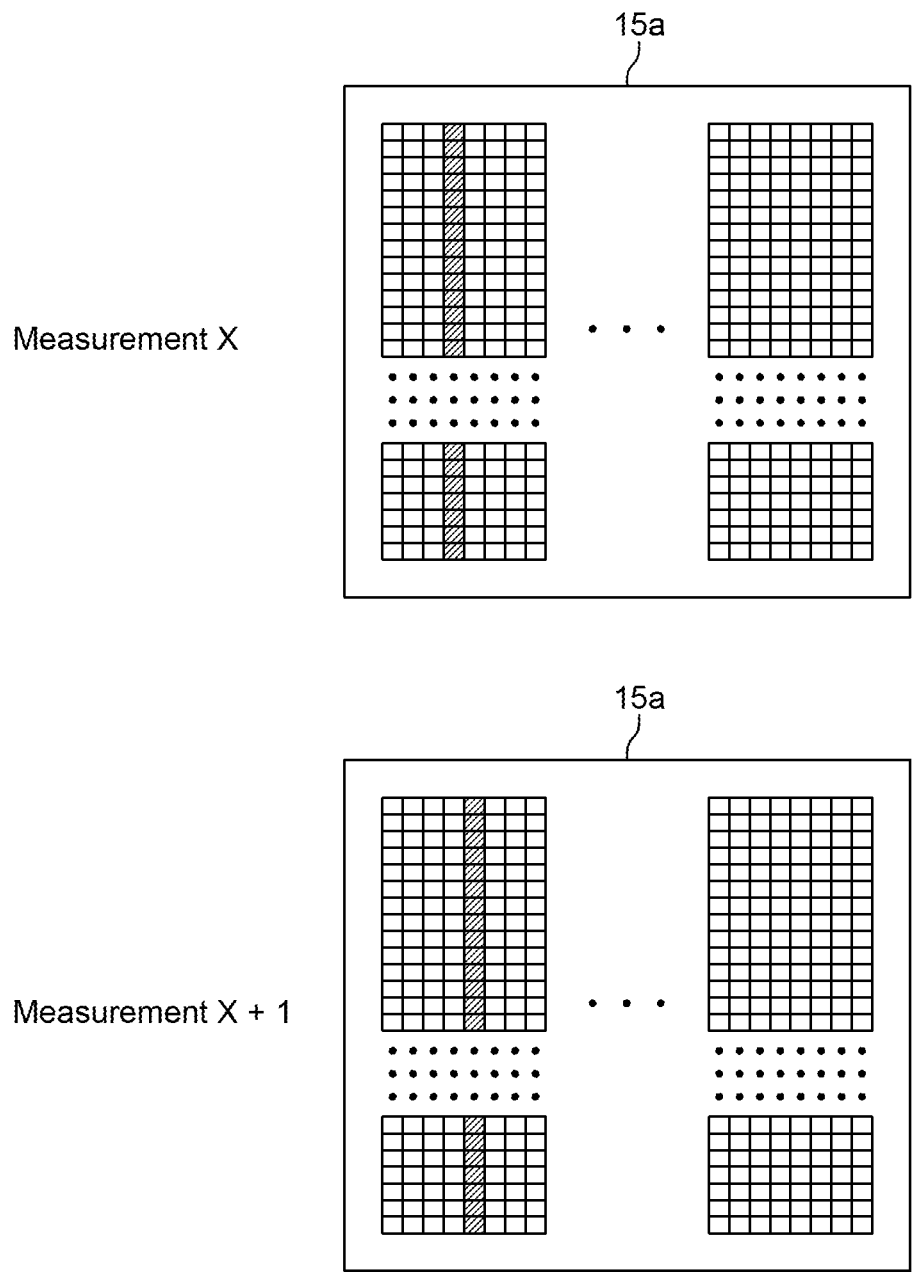
FIG. 9 shows a schematic diagram of a 2D photodetector array implementing a scanning method according to one or more embodiments.

FIG. 9 shows a schematic diagram of a 2D photodetector array implementing a scanning method according to one or more embodiments. In particular, multiple measurements X are taken during a readout cycle, during which a single active pixel column is incremented in a scanning direction for each measurement, as shown. The active pixel column is read out by the analog readout circuit 15c for the respective measurement.

Figure 10:
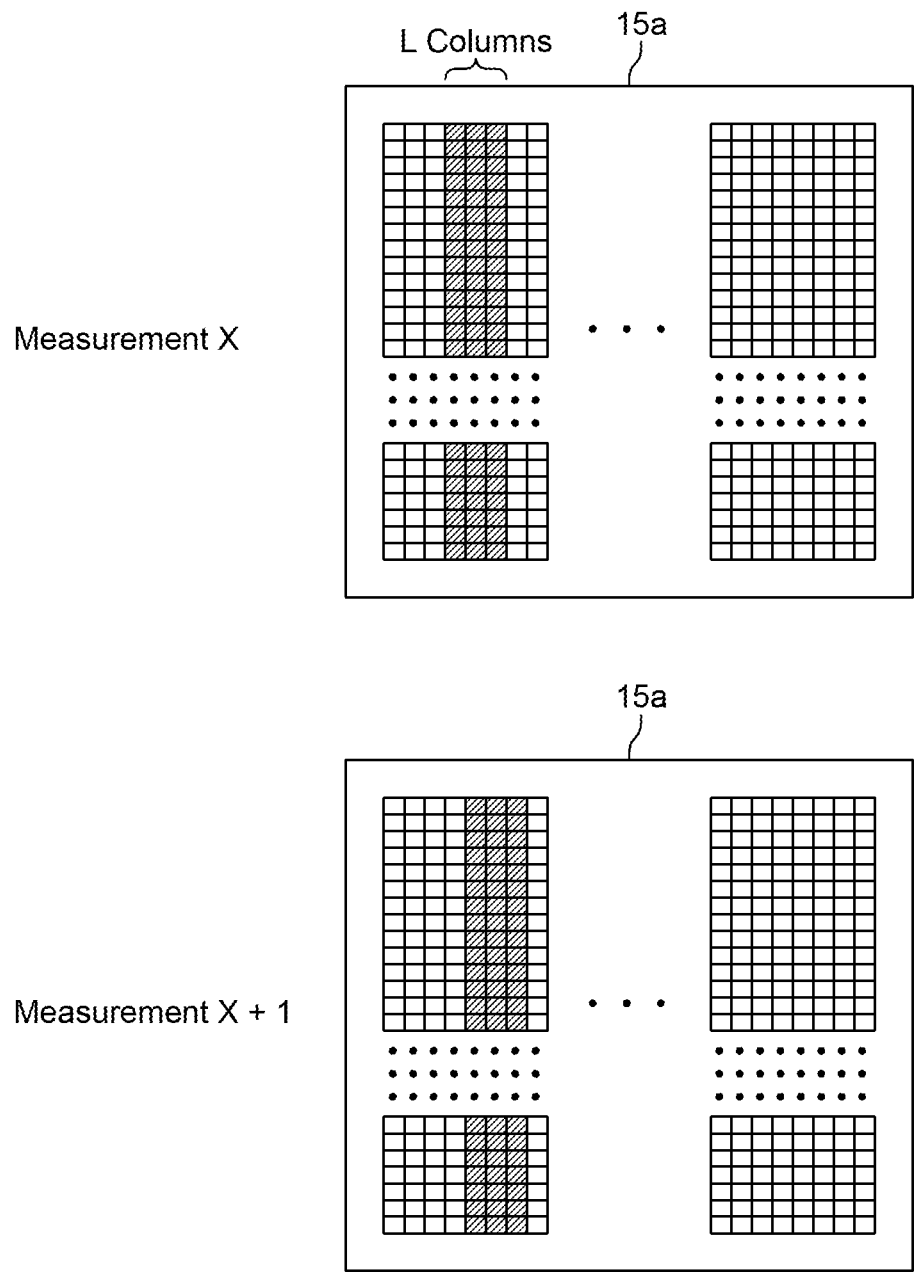
FIG. 10 shows a schematic diagram of a 2D photodetector array implementing a scanning method according to one or more embodiments.

FIG. 10 shows a schematic diagram of a 2D photodetector array implementing a scanning method according to one or more embodiments. In particular, multiple measurements X are taken during a readout cycle, during which multiple active pixel columns L are incremented in a scanning direction for each measurement, as shown. The multiple active pixel columns L are read out by the analog readout circuit 15c for the respective measurement.

Figure 11:
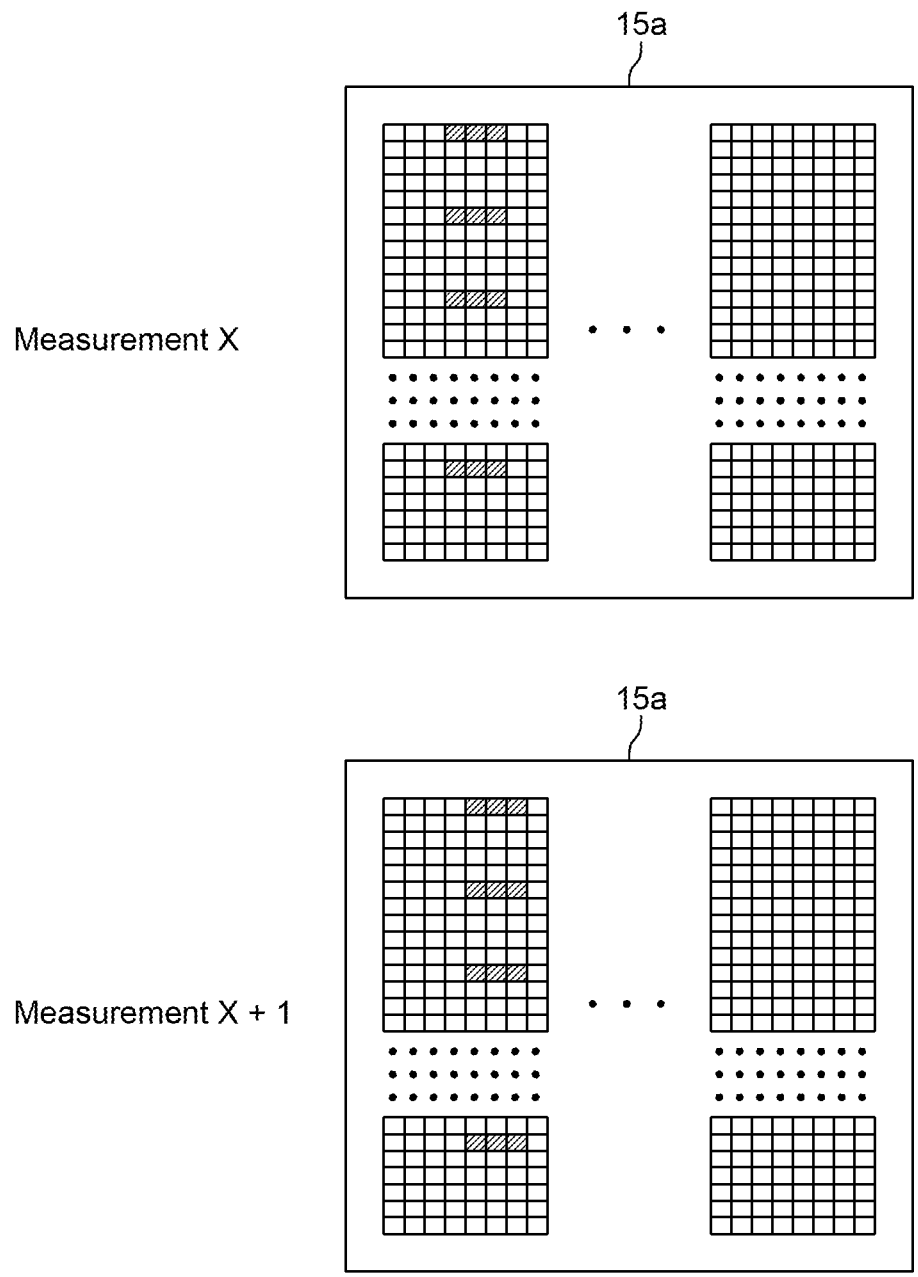
FIG. 11 shows a schematic diagram of a 2D photodetector array implementing a scanning method according to one or more embodiments.

FIG. 11 shows a schematic diagram of a 2D photodetector array implementing a scanning method according to one or more embodiments. In particular, multiple measurements X are taken during a readout cycle, during which multiple active pixel columns L are incremented in a scanning direction for each measurement, as shown. Additionally, the scanning method may be paired with and other multiplexer method described above (e.g., interleaving, binning, ROI, or combination thereof). This may also be applied to single column scanning shown in FIG. 9.

In FIGS. 9-11, each active column or columns is synchronized with the receiving line RL (i.e., synchronized with a timing of a light pulse from the illumination unit 10 and the transmission angle/direction defined by the MEMS mirror 12) for measuring a reflected light signal.

It is to be noted that multiple embodiments have been described. It is to be understood the various embodiments can be combined to obtain new embodiments. For example, the interleaving method described with respect to FIG. 4 can be combined with the binning method described with respect to FIG. 5 to obtain an interleaved binning readout embodiment as described with respect to FIG. 6. In other embodiments, the block read out method can be combined with the binning readout to obtain a block binning readout embodiment. It is further to be noted that the described system may also allow a dynamic switching between the described embodiments. Furthermore, for a specific readout, the rate at which the row selection and therefore the coupling to the channels is changed (e.g. with every received vertical line, with a predetermined number of received vertical scan lines or after a half readout cycle or a full readout cycle) can be changed dynamically based on a current situation or need.

Although embodiments described herein relate to a MEMS device with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) system, comprising:
   a LIDAR transmitter configured to scan a field of view with a plurality of laser beams according to a transmission interval, the LIDAR transmitter comprising:
   a one-dimensional scanning mirror configured to oscillate about a single scanning axis such that the plurality of laser beams are projected as a vertical scanning line into the field of view that moves horizontally across the field of view as the one-dimensional scanning mirror oscillates about the single scanning axis;
   a LIDAR receiver configured to receive a reflected light beam from a receiving direction, the reflected light beam having an oblong shape that extends in a lengthwise direction, the LIDAR receiver comprising:
      a two-dimensional (2D) photodetector array including a plurality of pixel rows and a plurality of pixel columns, wherein each pixel of the 2D photodetector array is configured to generate electrical signals based on received light, wherein the reflected light beam, incident on the 2D photodetector array, extends in the lengthwise direction along at least one receiving pixel column of the plurality of pixel columns according to the receiving direction;
      an analog readout circuit including a plurality of output channels configured to read out the electrical signals; and
   a multiplexer configured to, for each reading cycle, selectively couple receiving pixels of the at least one receiving pixel column to the plurality of output channels based on the receiving direction, while decoupling non-receiving pixels not included in the at least one receiving pixel column from the plurality of output channels based on the receiving direction such that the non-receiving pixels are disconnected from the analog readout circuit for a respective reading cycle,
   wherein the number of the plurality of output channels is N,
   wherein the 2D photodetector array includes a plurality of full pixel rows, a plurality of full pixel columns, and a plurality of pixel blocks that are mutually exclusive with respect to each other, each pixel block including N adjacent full pixel rows, wherein a number of the plurality of pixel blocks is K,
   wherein the analog readout circuit is configured to perform K reading cycles, wherein a different pixel block is selected for read out during each of the K reading cycles such that the plurality of pixel blocks are sequentially coupled to the analog readout circuit over the K reading cycles, and
   wherein the multiplexer is configured to couple a different pixel block of the plurality of pixel blocks for each reading cycle such that each of the N full pixel rows of the coupled pixel block is coupled to a different one of the plurality of output channels, while decoupling remaining pixel blocks of the plurality of pixel blocks from the analog readout circuit such that decoupled pixels are disconnected from the analog readout circuit for K−1 reading cycles.

2. The LIDAR system of claim 1, wherein the multiplexer is configured to selectively couple each of the plurality of output channels to at least one different pixel row of the plurality of pixel rows for each reading cycle.

3. The LIDAR system of claim 2, wherein the number of the plurality of output channels is less than the number of the plurality of pixel rows.

4. The LIDAR system of claim 1, wherein the receiving pixels are arranged into a plurality of pixel groups, each of the plurality of pixel groups corresponding to one or more of the plurality of pixel rows, and the multiplexer is configured to selectively couple each of the plurality of pixel groups to a corresponding one of the plurality of output channels.

5. The LIDAR system of claim 4, wherein the plurality of pixel groups are mutually exclusive of each other.

6. The LIDAR system of claim 1, further comprising:
a controller configured to synchronize coupling the receiving pixels of the at least one receiving pixel column to the plurality of output channels with the receiving direction.

7. The LIDAR system of claim 1, wherein the multiplexer is configured to sequentially couple and decouple the plurality of pixel columns to the plurality of output channels as the at least one receiving pixel column changes according to the receiving direction changing such that decoupled pixels are disconnected from the analog readout circuit for a respective reading cycle.

8. The LIDAR system of claim 1, wherein:
the vertical scanning line includes a first plurality of segments, each segment of the first plurality of segments originating from a different one of the plurality of laser beams,
the LIDAR transmitter comprises a plurality of light sources configured to generate the plurality of laser beams, wherein each of the plurality of light sources is configured to generate a different laser beam that corresponds to a different segment of the vertical scanning line,
wherein the reflected light beam comprises a second plurality of segments that correspond to the first plurality of segments of the vertical scanning line, each of the second plurality of segments extends in the lengthwise direction along a different segment of a plurality of segments of the at least one receiving pixel column.

9. The LIDAR system of claim 8, wherein each segment of the at least one receiving pixel column corresponds to a different one of the plurality of light sources, the LIDAR system further comprising:
a controller configured to synchronize coupling the receiving pixels to the plurality of output channels with an activation of at least one of the plurality of light sources such that the receiving pixels coupled to the plurality of output channels are located in at least one of the plurality of segments of the at least one receiving pixel column that receives the reflected light beam.

10. The LIDAR system of claim 9, wherein:
at least one light source of the plurality of light sources is inactive for each reading cycle such that the plurality of segments of the at least one receiving pixel column includes at least one inactive segment, and
the multiplexer is configured to decouple pixels of the at least one receiving pixel column located in the at least one inactive segment from the plurality of output channels such that the decoupled pixels are disconnected from the analog readout circuit for a respective reading cycle.

11. The LIDAR system of claim 1, wherein the coupled pixel block changes for each successive reading cycle.

12. The LIDAR system of claim 1, wherein:
the LIDAR transmitter further comprises a plurality of light sources configured to generate the plurality of laser beams upon being activated, wherein each of the plurality of light sources is configured to generate a different laser beam that corresponds to a different segment of the vertical scanning line, wherein each pixel block of the plurality of pixel blocks corresponds to a subset of the plurality of light sources; and
the LIDAR system further comprises a controller configured to select the coupled pixel block of the plurality of pixel blocks to be coupled by the multiplexer for each reading cycle such that the coupled pixel block corresponds to the subset of the plurality of light sources activated for a corresponding reading cycle.

13. The LIDAR system of claim 1, wherein the receiver further comprises:
an analog combining circuit for each of the plurality of output channels, wherein each analog combining circuit is configured to receive at least two of the electrical signals from the receiving pixels, generate a combined signal therefrom, and output the combined signal to a corresponding output channel of the plurality of output channels.

14. A Light Detection and Ranging (LIDAR) system, comprising:
a LIDAR transmitter configured to scan a field of view with a plurality of laser beams according to a transmission interval, the LIDAR transmitter comprising:
a one-dimensional scanning mirror configured to oscillate about a single scanning axis such that the plurality of laser beams are projected as a vertical scanning line into the field of view that moves horizontally across the field of view as the one-dimensional scanning mirror oscillates about the single scanning axis;
a LIDAR receiver configured to receive a reflected light beam from a receiving direction, the reflected light beam having an oblong shape that extends in a lengthwise direction, the LIDAR receiver comprising:
a two-dimensional (2D) photodetector array including a plurality of pixel rows and a plurality of pixel columns, wherein each pixel of the 2D photodetector array is configured to generate electrical signals based on received light, wherein the reflected light beam, incident on the 2D photodetector array, extends in the lengthwise direction along at least one receiving pixel column of the plurality of pixel columns according to the receiving direction;
an analog readout circuit including a plurality of output channels configured to read out the electrical signals; and
a multiplexer configured to, for each reading cycle, selectively couple receiving pixels of the at least one receiving pixel column to the plurality of output channels based on the receiving direction, while decoupling non-receiving pixels not included in the at least one receiving pixel column from the plurality of output channels based on the receiving direction such that the non-receiving pixels are disconnected from the analog readout circuit for a respective reading cycle,
wherein the number of the plurality of output channels is N,
wherein the 2D photodetector array includes a plurality of full pixel rows, a plurality of full pixel columns, and a plurality of pixel groups that are mutually exclusive with respect to each other, each pixel group including N adjacent full pixel rows, wherein a number of the plurality of pixel groups is N,
wherein the analog readout circuit is configured to perform N reading cycles, wherein a different full pixel row from each pixel group is selected for read out during each of the N reading cycles such that the N adjacent full pixel rows within each of the pixel groups are sequentially coupled to the analog readout circuit over the N reading cycles,
wherein, for each of the N reading cycles, the multiplexer is configured to couple one full pixel row from each pixel group to a different one of the plurality of output channels such that N non-adjacent full pixel rows are coupled to the plurality of output channels, while decoupling remaining full pixel rows of each pixel group from the analog readout circuit such that decoupled pixels are disconnected from the analog readout circuit for N−1 reading cycles, and wherein each of the plurality of output channels is associated exclusively with a corresponding one of the plurality of pixel groups, and each of the plurality of output channels is configured to be coupled to one of the N adjacent full pixel rows of the corresponding one of the plurality of pixel groups at a time.

15. The LIDAR system of claim 14, the receiver further comprises:

an analog combining circuit configured to generate a combined signal from the multiple pixel rows of the corresponding one of the plurality of pixel blocks by combining the electrical signals therefrom, and to output the combined signal to a corresponding output channel of the plurality of output channels.

16. A Light Detection and Ranging (LIDAR) system, comprising:

a LIDAR transmitter configured to scan a field of view with a plurality of laser beams according to a transmission interval, the LIDAR transmitter comprising:

a one-dimensional scanning mirror configured to oscillate about a single scanning axis such that the plurality of laser beams are projected as a vertical scanning line into the field of view that moves horizontally across the field of view as the one-dimensional scanning mirror oscillates about the single scanning axis;

a LIDAR receiver configured to receive a reflected light beam from a receiving direction, the reflected light beam having an oblong shape that extends in a lengthwise direction, the LIDAR receiver comprising:

a two-dimensional (2D) photodetector array including a plurality of pixel rows and a plurality of pixel columns, wherein each pixel of the 2D photodetector array is configured to generate electrical signals based on received light, wherein the reflected light beam, incident on the 2D photodetector array, extends in the lengthwise direction along at least one receiving pixel column of the plurality of pixel columns according to the receiving direction;

an analog readout circuit including a plurality of output channels configured to read out the electrical signals; and a multiplexer configured to, for each reading cycle, selectively couple receiving pixels of the at least one receiving pixel column to the plurality of output channels based on the receiving direction, while decoupling non-receiving pixels not included in the at least one receiving pixel column from the plurality of output channels based on the receiving direction such that the non-receiving pixels are disconnected from the analog readout circuit for a respective reading cycle, wherein the number of the plurality of output channels is N, wherein the 2D photodetector array includes a plurality of full pixel rows, a plurality of full pixel columns, and a plurality of pixel groups that are mutually exclusive with respect to each other, each pixel group comprising K adjacent full pixel rows arranged into R subsets of K/R adjacent full pixel rows, wherein a number of the plurality of pixel groups is N, and wherein K/R is two or more, wherein the analog readout circuit is configured to perform R reading cycles, wherein a different subset from each pixel group is selected for read out during each of the R reading cycles such that the R subsets within each of the pixel groups are sequentially coupled to the analog readout circuit over the R reading cycles, wherein, for each of the R reading cycles, the multiplexer is configured to couple one subset from each pixel group to a different one of the plurality of output channels such that non-adjacent subsets are coupled to the plurality of output channels, while decoupling remaining full pixel rows of each pixel group from the analog readout circuit such that decoupled pixels are disconnected from the analog readout circuit for R−1 reading cycles, and wherein each of the plurality of output channels is associated exclusively with a corresponding one of the plurality of pixel groups, and each of the plurality of output channels is configured to be coupled to one of the subsets of the corresponding one of the plurality of pixel groups at a time.

17. The LIDAR system of claim 16, wherein:

for a first reading cycle, each of the plurality of output channels is coupled to a first subset of the multiple pixel rows of the corresponding one of the plurality of pixel groups, and for a second reading cycle, each of the plurality of output channels is coupled to a second subset of the multiple pixel rows of the corresponding one of the plurality of pixel groups, wherein the first subset and the second subset are different.

18. The LIDAR system of claim 17, wherein pixel rows of the first subset of the multiple pixel rows are adjacent to each other, and pixel rows of the second subset of the multiple pixel rows are adjacent to each other.

* * * * *